(12) United States Patent
Kim et al.

(10) Patent No.: US 11,330,805 B2
(45) Date of Patent: May 17, 2022

(54) METHOD FOR INDUCING ARTIFICIAL HIBERNATION OF FISH, LIVE FISH PACKAGING METHOD, AND LIVE FISH PACKAGING CONTAINER

(71) Applicant: THE FISH Co., LTD., Jeju-si (KR)

(72) Inventors: Wan Soo Kim, Ansan-si (KR); Mun Seon Gong, Pyeongtaek-si (KR); Sang Eun Han, Bucheon-si (KR)

(73) Assignee: THE FISH CO., LTD., Jeju-si (KR)

( * ) Notice: Subject to any disclaimer, the term of this patent is extended or adjusted under 35 U.S.C. 154(b) by 0 days.

(21) Appl. No.: 16/957,449

(22) PCT Filed: Jun. 17, 2018

(86) PCT No.: PCT/KR2018/015987
§ 371 (c)(1),
(2) Date: Jun. 24, 2020

(87) PCT Pub. No.: WO2019/132348
PCT Pub. Date: Jul. 4, 2019

(65) Prior Publication Data
US 2020/0323179 A1    Oct. 15, 2020

(30) Foreign Application Priority Data

Dec. 27, 2017   (KR) ................... 10-2017-0181268
Nov. 23, 2018   (KR) ................... 10-2018-0145831

(51) Int. Cl.
*A01K 63/02*      (2006.01)
*A01K 63/06*      (2006.01)
(Continued)

(52) U.S. Cl.
CPC .............. *A01K 63/02* (2013.01); *A01K 63/06* (2013.01); *B65B 25/061* (2013.01); *B65B 31/02* (2013.01);
(Continued)

(58) Field of Classification Search
CPC ...... A01K 63/02; A01K 63/06; B65B 25/061; B65B 31/02; B65B 63/08; B65D 81/20; B65D 85/50
See application file for complete search history.

(56) References Cited

FOREIGN PATENT DOCUMENTS

| CN | 1669413 A | 9/2005 | |
|----|-----------|--------|---|
| FR | 2883263 A1 * | 9/2006 | ............. B65D 85/50 |

(Continued)

*Primary Examiner* — Timothy D Collins
*Assistant Examiner* — Brittany A Lowery
(74) *Attorney, Agent, or Firm* — Rabin & Berdo, P.C.

(57) ABSTRACT

The present invention relates to a method for inducing artificial hibernation of fish that is capable of transporting the fish in a state of being alive for long hours. According to the present invention, a water temperature is gradually decreased from an initial water temperature to the lowest water temperature, the fish are induced to the artificial hibernation, and they are packed in a waterless state. The packing is carried out in an environment where the lowest water temperature is constantly maintained, and a refrigerant is also packed to constantly maintain a temperature in a packing container, while oxygen is continuously supplied to the live fish induced to the artificial hibernation. The fish are individually packed in the Styrofoam box, and even if an atmospheric pressure in the airport is lowered during transport of the fish, there is no danger of causing respiration of the fish to be hard due to a plastic bag damaged. Through the hibernation inducing method and packing capable of reducing stress of the fish, in addition, the fish can be alive in a waterless environment for 36 hours or more, thereby making possible to globally distribute the live fish.

4 Claims, 9 Drawing Sheets
(4 of 9 Drawing Sheet(s) Filed in Color)

(51) Int. Cl.
*B65B 25/06* (2006.01)
*B65B 31/02* (2006.01)
*B65B 63/08* (2006.01)
*B65D 81/20* (2006.01)
*B65D 85/50* (2006.01)

(52) U.S. Cl.
CPC .............. *B65B 63/08* (2013.01); *B65D 81/20* (2013.01); *B65D 85/50* (2013.01)

(56) References Cited

FOREIGN PATENT DOCUMENTS

| | | | | |
|---|---|---|---|---|
| JP | H03275469 A | | 12/1991 | |
| JP | H05229804 A | | 9/1993 | |
| JP | 2008188008 A | | 8/2008 | |
| JP | 2014161239 A | * | 9/2014 | |
| JP | 2014161239 A | | 9/2014 | |
| KR | 1019930003808 A | | 3/1993 | |
| KR | 100740457 B1 | | 7/2007 | |
| WO | WO-2005039280 A1 | * | 5/2005 | ............. A01K 63/02 |
| WO | 2017047107 A1 | | 3/2017 | |
| WO | WO-2017047583 A1 | * | 3/2017 | ............. A01K 63/02 |

* cited by examiner

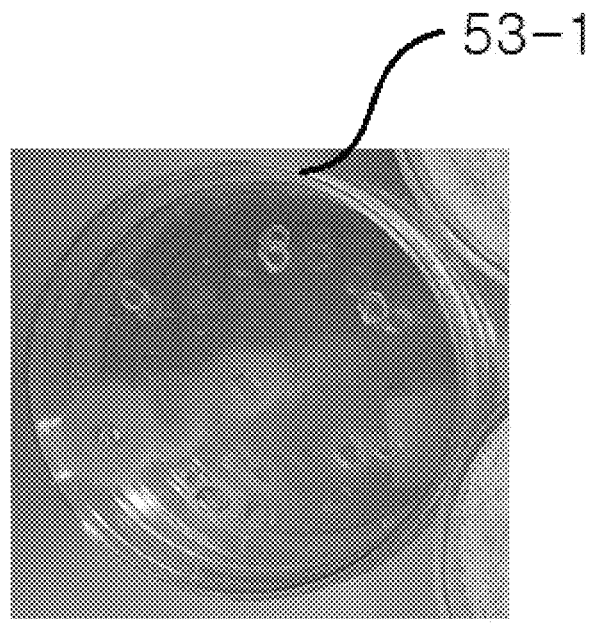
FIG. 3
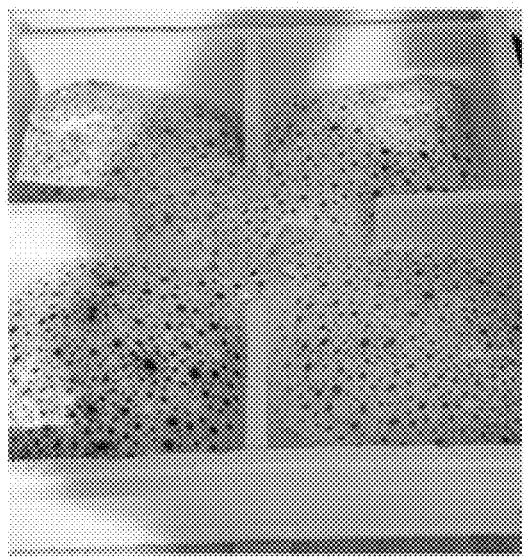 
FIG. 4A	FIG. 4B

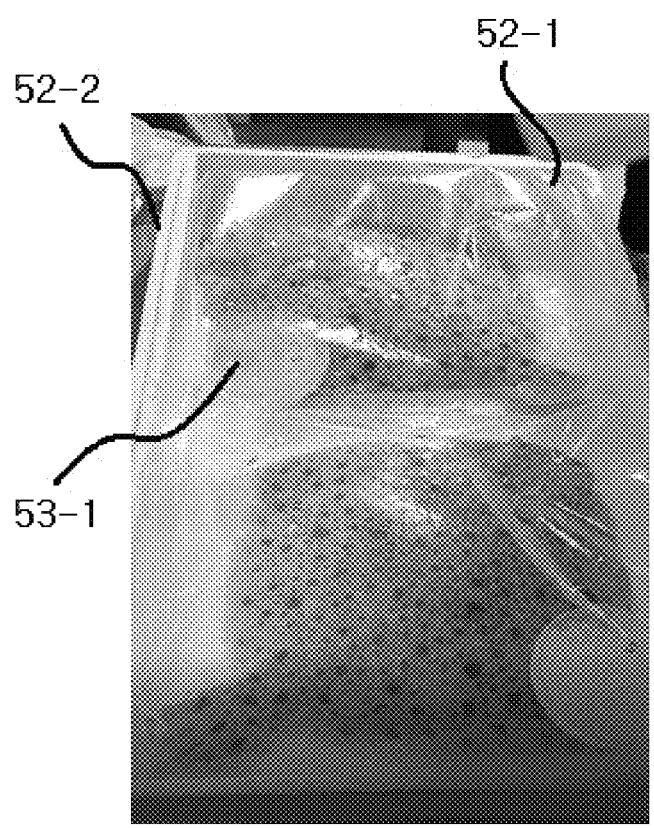
FIG. 5A
FIG. 5B

METHOD FOR INDUCING ARTIFICIAL HIBERNATION OF FISH, LIVE FISH PACKAGING METHOD, AND LIVE FISH PACKAGING CONTAINER

TECHNICAL FIELD

The present invention relates to a method for inducing artificial hibernation of fish to transport the fish in a waterless environment in a state where the fish are alive for long hours, and to a method and container for packing fish induced to artificial hibernation.

BACKGROUND ART

A method for transporting marine life inclusive of live fish includes anesthetic transport, electric shock transport, cooling water tank transport, artificial hibernation transport, and so on.

In this case, the anesthetic transport causes sanitary problems and also inspires disgust, and the electric shock transport has difficulties in preprocessing, danger of death, and decrement in quality of flesh, thereby making it hard to be widely utilized.

The cooling water tank transport using a live fish vehicle, which basically adopts a method of lowering a water temperature of a water tank, has some problems, such as, high cost for the live fish vehicle, uncertainty in physiological characteristics at low temperature according to fish species, danger of death of the marine life during transport for long hours, difficulties in maintaining freshness, deterioration of taste, and so on.

So as to avoid such problems as mentioned above, the artificial hibernation transport is desirable in transporting the live fish for long hours, but conventional hibernation inducing methods have had inconveniences in finding a range of a water temperature where endogenous biorhythm of the fish is stopped by means of an automatic respiration measuring device. So as to reduce a death rate of the fish and to more efficiently transport the fish, further, various studies on hibernation induction and transport of the fish are needed.

So as to transport the live fish by airplane, on the other hand, a method wherein water and live fish are put in a plastic bag and they are then loaded in a Styrofoam box is used, and otherwise, a method wherein fish induced to artificial hibernation are transported in a waterless state is used.

When the water and live fish are put in the plastic bag and are thus transported, by the way, a high physical distribution cost occurs due to the weight and volume of the water.

So as to transport the fish induced to artificial hibernation in a waterless state, on the other hand, the live fish is put in a plastic bag, oxygen is injected into the plastic bag, and the plastic bag is sealed and transported. This method reduces the physical distribution cost because no water is put in the plastic bag, but if an altitude of the airplane is raised, an atmospheric pressure becomes low to cause the plastic bag to be broken up. If the plastic bag is broken up, it may be attached to the surfaces of the bodies of the live fish. If the fish are exposed to the air, the plastic bag may inhibit the cutaneous respiration of the fish, and accordingly, the fish may die due to lack of oxygen.

DISCLOSURE

Technical Problem

Accordingly, the present invention has been made to solve the above-mentioned problems, and it is an object of the present invention to provide a method for inducing artificial hibernation of fish efficiently, while reducing stress applied to the fish.

It is another object of the present invention to provide a method and container for packing live fish that are capable of transporting the live fish induced to artificial hibernation in a waterless environment in a state where the fish are alive for long hours.

The technical problems to be achieved through the present invention are not limited as mentioned above, and other technical problems not mentioned herein will be obviously understood by one of ordinary skill in the art through the following description.

Technical Solution

To accomplish the above-mentioned objects, according to one aspect of the present invention, there is provided a method for inducing artificial hibernation of fish, the method including: the stabilizing step of stabilizing the fish at an initial water temperature for a given time; the first adapting step of gradually decreasing a water temperature from the initial water temperature to an appropriate water temperature; the hibernation preparing step of maintaining the appropriate water temperature during hibernation preparing time; and the hibernation inducing step of lowering the water temperature up to the lowest water temperature at which the hibernation of fish is induced.

In this case, the lowest water temperature is a temperature at a time point where swimming activities of the fish are stopped, and a difference between the appropriate water temperature and the lowest water temperature is set to 5° C. or under.

The stabilizing step is carried out to allow the fish to be stabilized at the initial water temperature of 10 to 30° C. for 12 hours, and the lowest water temperature at which the hibernation of the fish is induced is set to the range between 2 and 4° C.

The appropriate water temperature is set to 3 to 7° C. or to 9 to 15° C., and the hibernation preparing time is in the range between 23 and 25 hours.

The hibernation inducing step allows the water temperature to be decreased to the lowest water temperature within 2 to 7 minutes.

The first adapting step repeatedly performs a process of decreasing the water temperature by a given value until the water temperature reaches the appropriate water temperature and then maintaining the water temperature for a given time.

In this case, the process of decreasing the water temperature is performed at a ratio of 5° C./hour, and each decreased water temperature is kept for 6 to 12 hours.

To accomplish the above-mentioned objects, according to another aspect of the present invention, there is provided a container for packing fish induced to hibernation, including: a packing part for sealing the fish; a refrigerant for constantly maintaining an internal temperature of the packing part; and an oxygen supply part for supplying oxygen to the fish.

In this case, the oxygen supply part is made of a material made by mixing potassium superoxide and gypsum at a given ratio.

Also, a weight ratio of the potassium superoxide to the gypsum is 20 to 80.

The oxygen supply part has a shape of a plastic container having a cap and is provided with one or more holes through which oxygen passes.

The refrigerant maintains the internal temperature of the packing part to the range between 2 and 6° C. for at least 36 hours.

To accomplish the above-mentioned objects, according to yet another aspect of the present invention, there is provided a method for packing live fish so as to transport the fish in a state of being alive, including: the second adapting step of gradually decreasing a water temperature from an initial water temperature to the lowest water temperature; the packing preparing step of maintaining the lowest water temperature for a given time; and the packing step of packing the fish in a waterless state in an environment where the lowest water temperature is constantly maintained, wherein a given amount of oxygen is injected into a packing box in the packing step.

The second adapting step repeatedly performs a process of decreasing the water temperature by a given value until the water temperature reaches the lowest water temperature and then maintaining the water temperature for a given time, and the ratio of decreasing the water temperature is 5° C./hour or under.

The fish are olive flounder, the initial water temperature ranges between 15 and 17° C., the lowest water temperature ranges between 3 and 5° C., and the fish are maintained at the initial water temperature for 6 to 10 hours, at a water temperature of 12° C. for 12 to 16 hours, at a water temperature of 8° C. for 6 to 10 hours, and at the lowest water temperature for 12 to 24 hours.

In the packing step, an amount of oxygen injected into the packing box is greater than 45% and less than 55%.

The packing step includes the steps of: individually packing the fish in a packing container; packing one or more packing containers in a bulk box and sealing the bulk box; punching one or more holes onto the bulk box and injecting oxygen into the bulk box; sealing the holes adapted to inject the oxygen into the bulk box; and packing the bulk box in an insulating material.

The holes for injecting the oxygen into the bulk box are formed in a diagonal direction with respect to the surface of the bulk box.

To accomplish the above-mentioned objects, according to still another aspect of the present invention, there is provided a container for packing live fish so as to transport the fish in a state of being alive, including: accommodation spaces for accommodating one or more fish individually, while the fish are not laid on each other; one or more accommodation spaces for accommodating refrigerants; and one or more oxygen inlets adapted to introduce oxygen from the outside when a cap is covered thereon.

The container is made of a Styrofoam material.

Also, the accommodation spaces are formed according to the shapes of olive flounder and to arrange two olive flounder in the opposite directions to each other so as to prevent the two olive flounder from coming into contact with each other.

Advantageous Effects

According to the present invention, the method for inducing artificial hibernation of fish is carried out by step by step decreasing a water temperature from a normal water temperature to the lowest water temperature at which normal swimming activities of the fish are stopped, and in this case, an appropriate water temperature at a just step before the lowest water temperature and time staying in the step are set as the most appropriate water temperature and time found by experiments.

In addition, the method for inducing artificial hibernation of fish according to the present invention does not give any cold shock to the fish, and in this case, the stress applied to the fish can be substantially decreased.

Further, the container for packing the fish induced to the artificial hibernation is maintained at an appropriate temperature through refrigerants located at the interior thereof and has oxygen continuously supplied, so that the survival time of the fish in the waterless environment can be extended for 36 hours or more.

Furthermore, the oxygen is supplied through the solid oxygen generating material, and it is injected into the packing box through an air gun. If the oxygen is injected through the air gun, a sufficient amount of oxygen can be injected at an initial step according to transport time and characteristics of fish species, and accordingly, no separate member for supplying the oxygen is used, thereby having no need to form a separate space in the container for packing the live fish.

If the container for packing the live fish is made according to the shapes of the live fish, the live fish can be prevented from being laid on each other, and accordingly, the size of the container can be minimized, thereby reducing a physical distribution cost.

The fish are individually packed in the live fish packing container made of Styrofoam, while no plastic bag is being used, so that even if an atmospheric pressure in the airport is lowered during transport of the fish, there is no danger of causing cutaneous respiration of the fish to be hard due to the plastic bag damaged.

Like this, the fish can be transported in a waterless environment in a state where they are alive for long hours, thereby making possible to globally distribute the live fish.

DESCRIPTION OF DRAWINGS

The file of this patent contains at least one drawing/photograph executed in color. Copies of this patent with color drawing(s)/photograph(s) will be provided by the Office upon request and payment of the necessary fee.

FIG. 3 is a photograph showing an oxygen supply part of the container according to the first embodiment of the present invention.

FIGS. 4a and 4b are photographs showing an example of the container made of Styrofoam.

FIGS. 5a and 5b are photographs showing an example where the fish are packed in a plastic bag.

MODE FOR INVENTION

Figure 1:
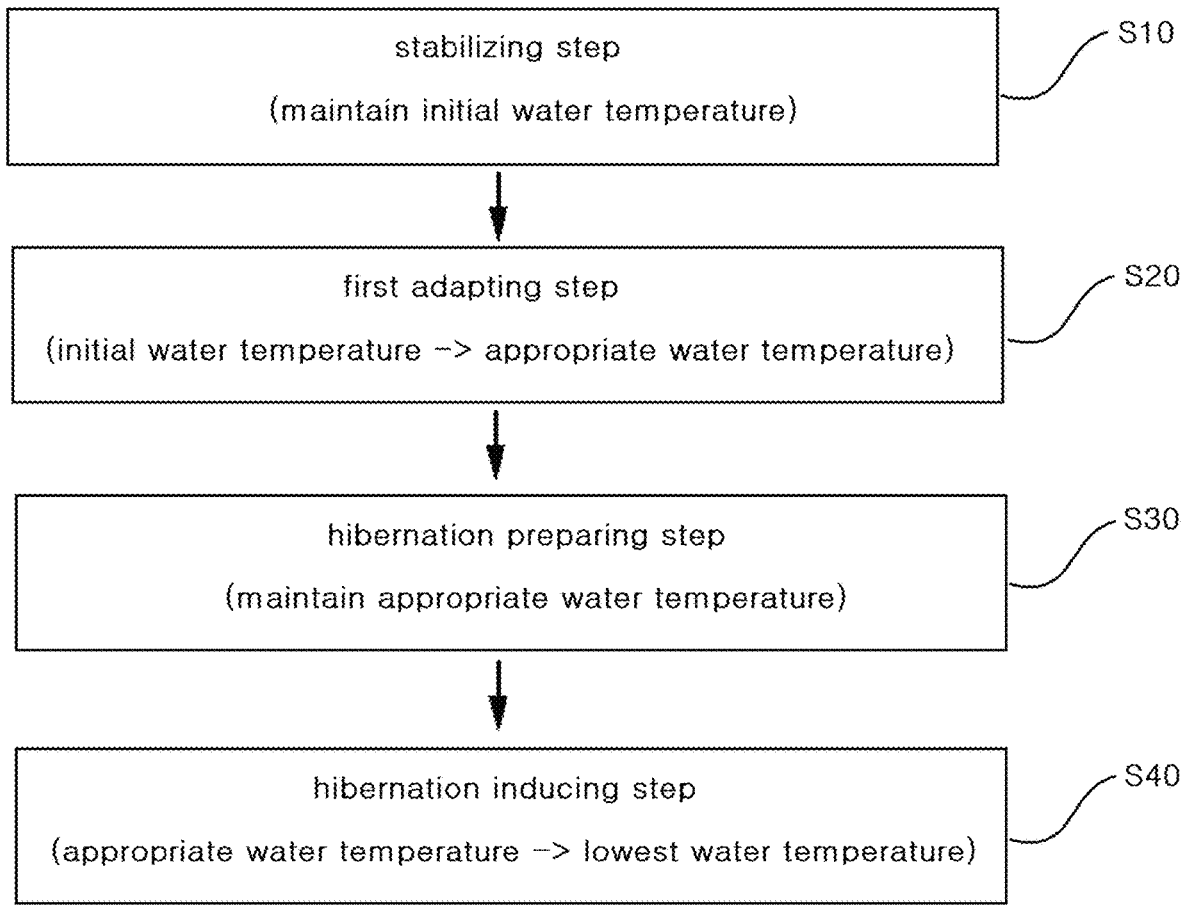
FIG. 1 is a flowchart showing a method for inducing artificial hibernation of fish according to the present invention.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

If it is determined that the detailed explanation on the well known technology related to the present invention makes the scope of the present invention not clear, the explanation will be avoided for the brevity of the description.

Terms used in this application are used to only describe specific exemplary embodiments and are not intended to restrict the present invention. An expression referencing a singular value additionally refers to a corresponding expression of the plural number, unless explicitly limited otherwise by the context.

In this application, terms, such as "comprise", "include", or 'have', are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

Terms, such as the first, the second may be used to describe various elements, but the elements should not be restricted by the terms. The terms are used to only distinguish one element from the other element.

Referring to FIG. 1, a method for inducing artificial hibernation of fish according to the present invention includes a stabilizing step S10, a first adapting step S20, a hibernation preparing step S30, and a hibernation inducing step S40. Through these steps, accordingly, the fish induced to a hibernation state can live for 36 hours even in a sealed environment with no water.

Stabilizing Step

The stabilizing step S10 is carried out to stabilize fish at an initial water temperature for a given time. In detail, the fish can be stabilized at a normal water temperature.

The initial water temperature is a water temperature of a fish farm, at which fish normally live. For example, the initial water temperature is set to 20° C., but it is not limited thereto. Desirably, the initial water temperature ranges between 10 and 30° C.

The stabilizing step S10 desirably stabilizes the fish at the initial water temperature for at least 12 hours or more, but it is not limited thereto. For example, the stabilizing step S10 may stabilize the fish at the initial water temperature for about 6 to 12 hours.

The initial water temperature and the time for the stabilization are freely set according to fish species, fish habitats, seasons, and so on, and the initial water temperature may be set to a water temperature at a fish farm at which the fish grows.

For example, a water temperature for initial stabilization of tropical fish is set in the range between 24 and 26° C., and, a water temperature for initial stabilization of olive flounder is set in the range between 9 and 10° C., which may be different according to seasons.

If the fish are transported by a live fish vehicle to a factory for inducing hibernation of the fish from the fish farm, in more detail, the fish may be badly influenced by engine noise of the vehicle and road stress, and as the fish are stabilized at the initial water temperature for enough time, accordingly, the stress applied to the fish during the transport can be reduced.

First Adapting Step

The first adapting step S20 gradually decreases the water temperature from the initial water temperature to an appropriate water temperature so that the fish can adapt to the decreased water temperature.

Desirably, the first adapting step S20 decreases the water temperature step by step to allow the fish to adapt well to the decreased water temperature. In detail, the water temperature is decreased by a given value until it reaches the appropriate water temperature, and next, the decreased water temperature is kept for a given time. This is repeatedly carried out.

A ratio of water temperature to hour for decreasing the water temperature is freely set. For example, the step of decreasing the water temperature is carried out at a ratio of 5° C./hour, and the decreased water temperature is kept for about 12 hours. Without being limited thereto, however, the decreased water temperature is kept for about 6 to 12 hours. For example, in detail, if it is assumed that the initial water temperature in the stabilizing step S10 is 20° C., the stabilizing step is carried out at the initial water temperature for 12 hours, and the water temperature in the first adapting step S20 is decreased to 15° C. and is then kept for 12 hours. Next, the water temperature decreased to 15° C. is decreased to 10° C. and is then kept for 12 hours. After that, the water temperature is decreased up to the appropriate water temperature (for example, 6° C.)

Hibernation Preparing Step

The hibernation preparing step S30 prepares hibernation just before the hibernation of fish, while maintaining the appropriate water temperature during hibernation preparing time. In this case, the appropriate water temperature is set higher than the lowest water temperature at which the fish hibernate.

A difference between the appropriate water temperature and the lowest water temperature is desirably set to 5° C. or under. The appropriate water temperature is set to 5 or 6° C., but it is not limited thereto. For example, the appropriate water temperature is set to 5 to 6° C. in summer and 3 to 4° C. in winter.

The hibernation preparing time during which the appropriate water temperature is maintained is freely set. Desirably, the hibernation preparing time is greater than 24 hours, but it is not limited thereto. For example, the hibernation preparing time is in the range between 23 and 25 hours.

If the hibernation preparing time (for example, 24 hours) is sufficiently maintained at a low water temperature (appropriate water temperature) having no influences on the living of the fish, the fish as poikilotherm can adapt to even the low water temperature. Further, if the low water temperature is similar to a temperature in a container where the fish being in the state of hibernation is packed and transported for long hours (for example, 36 hours), the fish can adapt to the low water temperature.

The appropriate water temperature may be changed according to fish species, fish habitats, and seasons. According to seasons, for example, olive flounder have the appropriate water temperature of 3 to 6° C., convict grouper have the appropriate water temperature of 10 to 12° C., and coral fish have the appropriate water temperature of 12 to 14° C.

Hibernation Inducing Step

The hibernation inducing step S40 lowers the water temperature up to the lowest water temperature at which the hibernation of fish is induced.

In this case, the lowest water temperature is a temperature at a time point where swimming activities of fish are stopped. The lowest water temperature at which the hibernation of fish is induced is set to 3° C., but it is not limited thereto. For example, the lowest water temperature may be set in the range between 2 and 4° C.

The hibernation inducing step rapidly decreases the water temperature from the appropriate water temperature to the lowest water temperature for a given time. The time for decreasing the water temperature from the appropriate water temperature to the lowest water temperature is freely set, and for example, the water temperature is decreased to the lowest water temperature within 2 to 7 minutes.

For example, in detail, if the appropriate water temperature is 6° C. and the lowest water temperature is 3° C., the water temperature after the hibernation preparing step has been finished is decreased from 6° C. to 3° C. for about 5 minutes, thereby inducing the hibernation of fish.

Through the hibernation inducing step S40, the hibernation of the fish is carried out. The lowest water temperature is a temperature that is determined by observing the behaviors of the fish, and a temperature shock (cold shock) at a low water temperature within a short time is applied to the fish. The lowest water temperature is lower than a water temperature at a habitat where the fish lives, and if the fish are exposed to the lowest water temperature for a long time, accordingly, the fish die. Accordingly, the time during which the fish is exposed to the low water temperature is desirably as short as possible.

As mentioned above, the fish whose hibernation is induced is sealingly packed by the container for packing the live fish according to the present invention and is transported in a waterless state.

Figure 2:
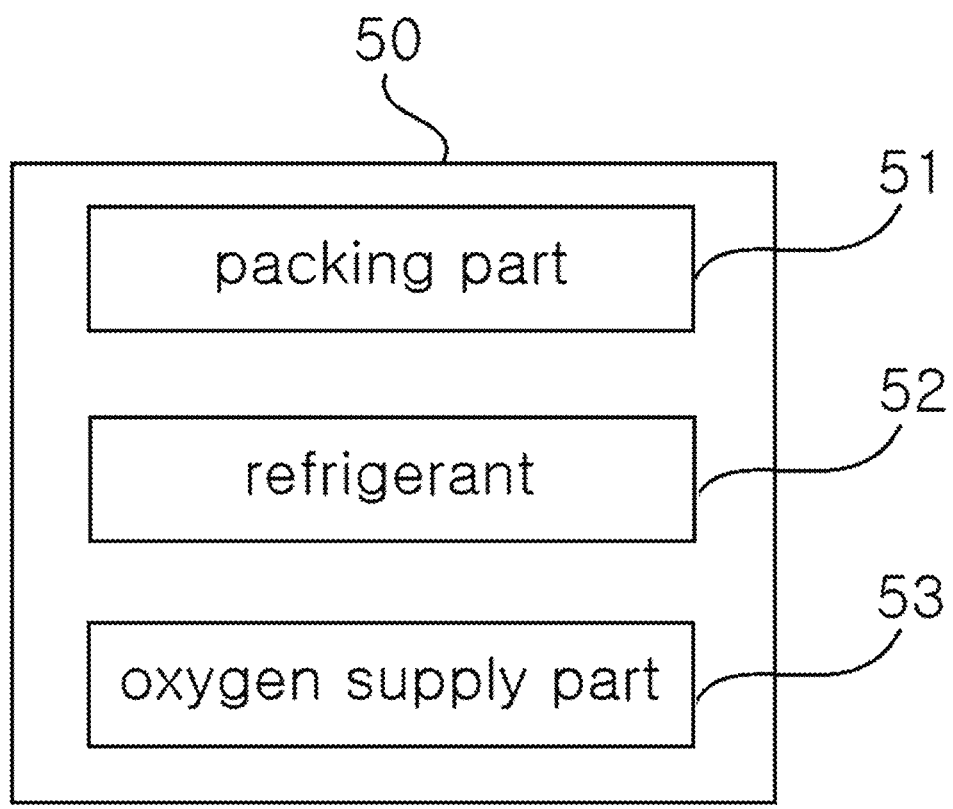
FIG. 2 is a block diagram showing a container for packing live fish according to a first embodiment of the present invention.

Referring to FIG. 2, a container 50 for packing live fish according to a first embodiment of the present invention, which packs the fish induced to the hibernation, includes a packing part 51 for sealing the fish, a refrigerant 52 for constantly maintaining an internal temperature of the packing part 51, and an oxygen supply part 53 for supplying oxygen to the fish.

The packing part 51 is made of various materials and seals the fish through various packing ways.

For example, the packing part 51 includes a plastic bag for putting and sealing the fish and a Styrofoam box in which one or more plastic bags having the fish are accommodated.

For another example, the fish whose hibernation is induced is accommodated directly in the Styrofoam box, without any plastic bag, and next, the Styrofoam box is sealed.

The Styrofoam box is sealed one more time by means of an insulating material for blocking an external temperature, like vinyl, urethane, and so on.

The refrigerant 52, which constantly maintains an internal temperature of the packing part 51, is made of various materials.

The internal temperature of the packing part 51 that can be maintained through the refrigerant 52 and the time for maintaining the internal temperature are freely set according to needs, and in detail, the internal temperature of the packing part 51 is not greater than an appropriate temperature (for example, 6° C.) for at least 36 hours. However, the internal temperature is not limited thereto. For example, the refrigerant 52 may maintain the internal temperature of the packing part 51 to the range between 2 and 6° C. for at least 36 hours.

The oxygen supply part 53, which supplies oxygen to the fish, is freely configured in consideration of the conveniences in accommodation and transport and the stability of oxygen supply.

A material for generating oxygen is configured to the form of solid. For example, the material for generating oxygen is made of a material made by mixing potassium superoxide ($KO_2$) and gypsum ($CaSO_4$) at a given ratio. In this case, carbon dioxide ($CO_2$) generated from breathing of the fish produces oxygen ($O_2$) through the following chemical reaction.

*$4KO_2 + 2H_2O + 4CO_2 \rightarrow 4KHCO_3 + 3O_2$

A weight ratio of potassium superoxide to gypsum is freely set, and a detailed ratio is 20 to 80.

For example, the oxygen supply part 53 has a shape of a plastic container having a cap, like a Petri dish, that is provided with one or more holes through which oxygen passes. The material made by mixing potassium superoxide ($KO_2$) and gypsum ($CaSO_4$) at the given ratio is accommodated in the plastic container and is located inside the packing part 51 in which the fish induced to hibernation is sealed to thus supply oxygen to the fish.

As described above, the water temperature is lowered to a state where the fish lose the body balance and thus fall or the fish whose fins do not move anymore, thereby inducing the hibernation of the fish, and next, the fish whose hibernation is induced are packed by means of the solid type oxygen generating material and the refrigerant and are then transported, thereby allowing the fish to be kept alive for at least 36 hours or more in the waterless state.

First Example of Experiment

Examples of experiments of the method for inducing the hibernation of fish according to the present invention and the container 50 for packing the live fish according to the first embodiment of the present invention will be explained. The fish used in the experiments are turbot and an amount of salt in sea water ranges from 31.2 to 32.4%.

1. Hibernation Process Example from Water Temperature of Fish Farm to Artificial Hibernation (1) It was assumed that a water temperature of a fish farm is 20° C.

A water temperature of a water tank was previously set to 20° C. before the experiment, and fish were put in the water tank. The time for stabilizing the fish in the stabilizing step S10 was kept for 6 to 12 hours, and an appropriate water temperature in the hibernation preparing step S30 was 5° C. and was kept for 24 hours.

Examples of the water temperatures and keeping time in the respective steps were suggested in Table 1.

TABLE 1

| Water temperature (° C.) | Time (hour) |
|---|---|
| 20 | 6 to 12 |
| 15 | 6 to 12 |
| 10 | 6 to 12 |
| 5 | 24 |
| 3 | 0.05 (three minutes) |

(2) It was assumed that a water temperature of a fish farm is 15° C.

A water temperature of a water tank was previously set to 15° C. before the experiment, and fish were put in the water tank. The time for stabilizing the fish in the stabilizing step S10 was kept for 6 to 12 hours, and an appropriate water temperature in the hibernation preparing step S30 was 5° C. and was kept for 24 hours. Examples of the water temperatures and keeping time in the respective steps were suggested in Table 2.

TABLE 2

| Water temperature (° C.) | Time (hour) |
|---|---|
| 15 | 6 to 12 |
| 10 | 6 to 12 |
| 5 | 24 |
| 3 | 0.05 (three minutes) |

2. Comparison Between Survival Rates of Fish Adapting to Appropriate Water Temperature for 12 Hours and 24 Hours The fish adapted to an appropriate water temperature (for example, 5° C.) for 12 hours in the hibernation preparing step S30, and after the fish whose hibernation was induced were packed, the fish were in a waterless state for 36 hours. Contrarily, the fish adapted to an appropriate water temperature (for example, 5° C.) for 24 hours in the hibernation preparing step S30, and after the fish whose hibernation was induced were packed, the fish were in a waterless state for 36 hours. The survival rates of the fish were compared with each other, and the results were indicated in Table 3.

TABLE 3

| No. | Adapting time | Mean body length (mm) | Mean body height (mm) | Mean body weight (g) | Number of fish alive (n) | Number of dead fish (n) | Number of fish (n) | Survival rate (%) | Hibernation inducing time in waterless state (h) |
|---|---|---|---|---|---|---|---|---|---|
| 1 | 12 hours | 342 | 262 | 835 | 6 | 24 | 30 | 20 | 36 |
| 2 | 24 hours | 350 | 240 | 960 | 111 | 9 | 120 | 93 | 36 |

When the fish adapted to the appropriate water temperature for 12 hours, the survival rate of the fish in 36 hours was 20%, and contrarily, when the fish adapted to the appropriate water temperature for 24 hours, the survival rate of the fish in 36 hours was 93%. It can be appreciated that the adaptation time for more than 24 hours is very important in the hibernation preparing step S30. In this case, the hibernation inducing time in the waterless state means the time during which the fish induced to the hibernation are packed and remain in the waterless state.

3. Solid Oxygen Generating Material of Oxygen Supply Part

If 100% potassium superoxide ($KO_2$) powder is used, a fire may occur. For example, if the potassium superoxide ($KO_2$) powder is packed in a non-woven fabric, it reacts with water in the air, so that heat occurs to cause the non-woven fabric to catch fire. Such problems have big limitations especially in air transport.

So as to completely remove a danger of fire, accordingly, the potassium superoxide ($KO_2$) powder and the gypsum ($CaSO_4$) are mixed at a given ratio. The ratio may be freely set in the range capable of completely removing the danger of fire. For example, the ratio of the potassium superoxide ($KO_2$) powder to the gypsum ($CaSO_4$) is 20:80.

A container for accommodating the material made by mixing the potassium superoxide ($KO_2$) powder and the gypsum ($CaSO_4$) at the given ratio is freely configured, and for example, the container is formed of a flat plastic container with a cap that has a plurality of holes formed thereon.

FIG. 3 is a photograph showing an example of the Petri dish-like plastic container 53-1 having holes, and in this case, if a mixture of the potassium superoxide powder and the gypsum (at the ratio of 20 to 80) is contained in the plastic container 53-1, the oxygen supply part 53 can be prepared.

Table 4 shows results using the material made by mixing the potassium superoxide powder and the gypsum ($CaSO_4$) at the ratio of 20 to 80.

A control group that did not make use of the solid oxygen generating material showed a survival rate of 50% in 36 hours in the waterless environment after the fish were packed, but when 5 g of the solid oxygen generating material was used, a survival rate of 100% was obtained.

TABLE 4

| $KO_2$ + $CaSO_4$ | Mean body length (mm) | Mean body height (mm) | Mean body weight (g) | Number of fish alive (n) | Number of dead fish (n) | Number of fish (n) | Survival rate (%) | Hibernation inducing time in waterless state (h) |
|---|---|---|---|---|---|---|---|---|
| Control | 380 | 290 | 1,015 | 2 | 2 | 4 | 50 | 36 |
| 5 g | 383 | 294 | 1,200 | 8 | 0 | 8 | 100 | 36 |

4. Examples of Container for Packing Live Fish (1) Plastic Packing (Oxygen Injection)+Styrofoam Box Table 5 shows the survival rate of fish when oxygen is injected into the plastic bag in which the fish induced to the hibernation are put, the plastic bag is sealed, and the sealed plastic bag is packed in Styrofoam boxes having different sizes.

TABLE 5

| No. | Plastic Packing | Mean body length (mm) | Mean body height (mm) | Mean body weight (g) | Number of fish alive (n) | Number of dead fish (n) | Number of fish (n) | Survival rate (%) | Hibernation inducing time in waterless state (h) |
|---|---|---|---|---|---|---|---|---|---|
| 1 | 20 l Styrofoam box | 329 | 244 | 688 | 18 | 0 | 18 | 100 | 36 |
| 2 | 30 l Styrofoam box | 328 | 248 | 670 | 18 | 0 | 18 | 100 | 36 |
| Total | | | | | 36 | 0 | 36 | | |

In this experiment, the plastic bag put in the 20 l Styrofoam box has a size of 68 cm×38 cm×18 cm, and the plastic bag put in the 30 l Styrofoam box has a size of 50 cm×31 cm×13 cm. The plastic bags are in a waterless state where water rarely exists. In case of both of the 20 l Styrofoam box and the 30 l Styrofoam box, the survival rates are 100%.

(2) Styrofoam Box (Oxygen Injection)+Vinyl Packing on the Outer Surfaces of the Styrofoam Box FIGS. 4a and 4b are photographs showing an example of the container according to the present invention. FIG. 4a shows a state where the fish induced to the hibernation are put directly in the 20 l Styrofoam box, and FIG. 4b shows a state where oxygen is injected to pack the Styrofoam box with vinyl.

Table 6 shows the survival rate of fish when such packing is used, and in this case, also, the survival rate is 100%.

TABLE 6

| No. | Plastic Packing | Mean body length (mm) | Mean body height (mm) | Mean body weight (g) | Number of fish alive (n) | Number of dead fish (n) | Number of fish (n) | Survival rate (%) | Hibernation inducing time in waterless state (h) |
|---|---|---|---|---|---|---|---|---|---|
| 1 | 20 l Styrofoam box | 381 | 295 | 1,129 | 10 | 0 | 10 | 100 | 36 |
| Total | | | | | 10 | 0 | 10 | | |

(3) Things to Note in the Plastic Bag Packing Process

The bellies of fish can come into contact with the bottom, but the skin of their backs does not have to come into contact with the plastic bag or box. As known, generally, the fish have branchial respiration, and an amount of oxygen generated through cutaneous respiration is 5 to 30% of the total amount of oxygen.

Since the fish induced to the hibernation are transported in a low temperature waterless environment for long hours, they rarely have any movement, have weak physiological and metabolic activities, and very much depend upon cutaneous respiration.

If the skin (backs) of fish comes into contact with the plastic bag at the time when the fish are packed in the plastic bag, the cutaneous respiration is inhibited to cause stress, and accordingly, the color of the skin becomes changed to die.

FIGS. 5a and 5b are photographs showing an example wherein after the container 53-1 in which the solid oxygen generating material is put is put into the plastic bag 52-1 having the fish put therein, the plastic bag 52-1 is sealed and packed in the Styrofoam box 52-2.

FIG. 5a shows a state where the plastic bag does not come into contact with the back of the fish put in the plastic bag, and FIG. 5b shows a state where the plastic bag comes into contact with the back of the fish put in the plastic bag. As shown in FIG. 5b, if the plastic bag comes into contact with the back of the fish, the color of the fish's skin becomes black, and the skin of the fish's back peels off.

If the fish are packed without the plastic bag, a danger of allowing the back skin to come into contact with the plastic bag can be removed. As mentioned above, Table 6 shows the survival rate of 100% when such packing is used.

5. Long Hour Artificial Hibernation Comparison Experiments (36, 48, and 60 Hours)

Experimental results of survival rates upon long hour artificial hibernation on the condition where oxygen is injected into a 20 l Styrofoam box are suggested in Table 7.

TABLE 7

| No. | Plastic Packing | Mean body length (mm) | Mean body height (mm) | Mean body weight (g) | Number of fish alive (n) | Number of dead fish (n) | Number of fish (n) | Survival rate (%) | Hibernation inducing time in waterless state (h) |
|---|---|---|---|---|---|---|---|---|---|
| 1 | 20 l Styrofoam box | 350 | 240 | 960 | 111 | 9 | 120 | 93 | 36 |
| 2 | 20 l Styrofoam box | 340 | 270 | 840 | 6** | 4 | 10 | 60 | 48 |
| 3 | 20 l Styrofoam box | 340 | 260 | 840 | 1* | 5 | 6 | 17 | 60 |
| Total | | | | | 118 | 18 | 136 | | |

In Table 7, a symbol '*' indicates that the fish die in two hours, '**' indicates that the fish are alive but they are slowly recovered. As appreciated from the experimental results, accordingly, it can be checked that an appropriate time during which the fish are packed in the waterless state after induced to the hibernation is about 36 hours.

6. Comparison Between Existing Methods and the Present Invention

The turbot and olive flounder induced to the artificial hibernation were put into a packing box whose internal temperature is maintained at 5° C., and the packing box was sealingly kept. As the keeping time passes, the survival rates of the turbot and the olive flounder were checked. The results are suggested in Table 8.

TABLE 8

| Experiment | Number of fish (n) | Fish Weight (g) | Survival Rate (%) | Hibernation inducing time in waterless state (h) |
|---|---|---|---|---|
| Existing method 1 * | 63 | 820~1,060 | 20~30 | 12~15 |
| Existing method 2 * | 140 | 720~1,340 | 90~100 | 24 |
| Method in the invention | 140 | 550~1,900 | 90~100 | 36 |

In Table 8, 'existing method 1' is a method wherein only a water temperature is decreased, without any use of artificial hibernation, and 'existing method 2' is a method wherein artificial hibernation is adopted, which is disclosed in Korean Patent No. 10-0740457. In Table 8, a symbol '*' (in the existing methods 1 and 2) indicates experiments using olive flounder, and the experiment according to the present invention are performed with the turbot.

When no artificial hibernation is used, the survival rate is drastically decreased to 20 to 30% even in 12 to 15 hours.

As the artificial hibernation inducing technology is used in the existing method 2, the survival rate becomes improved, but when the artificial hibernation inducing technology and the waterless packing technology according to the present invention are adopted, a high survival rate is obtained for the longest hours.

7. Reason why Artificial Hibernation for 36 Hours is Important

Air transport time from domestic Incheon airport to West LA in U.S.A. is about 11 hours, and air transport time from domestic Incheon airport to East New York in U.S.A. is about 14 hours.

As suggested in Table 9, if the air transport time is added to packing time, domestic transport time, and customs passing time, the time consumed up to LA in U.S.A. is at least 21 hours, and the time consumed up to New York in U.S.A. is at least 25 hours.

TABLE 9

| | Packing and domestic transport time | Airplane transport time | Arrival customs passing and transport time | Total |
|---|---|---|---|---|
| Incheon airport → LA of U.S.A. | 2 hours for packing + 1 hour for transport time + 3 hours for shipping | 11 hours | 3 to 5 hours for passing customs + 1.5 hours up to workplace | 21 to 24 hours |
| Incheon airport → New York of U.S.A. | | 14~15 hours | | 24 to 27 hours |

In detail, 27 hours are needed to ensure an appropriate survival rate when the live fish are transported to both of West and East of U.S.A., and in consideration of spare time, the packing technology capable of maintaining the hibernation for at least 30 hours is necessary. According to the present invention, the hibernation state can be maintained for at least 36 hours, and accordingly, it is possible that the live fish can be exported to the entire whole world excepting Latin America and some countries of Africa in which no direct flights exist in the domestic airports.

On the other hand, if the fish are induced to the artificial hibernation through the method according to the present invention and are thus transported in the waterless state, it is possible that the fish can be transported for long hours, but if the water temperature is drastically decreased up to the lowest water temperature in the last process where the artificial hibernation of the fish is carried out, cold shock may be applied to the fish.

Even if the fish are poikilotherm, a change of water temperature of 3 to 4° C. for a short time at a low temperature may apply stress to the fish, and such stress can decrease qualities and survival rates of the fish.

The container 50 according to the first embodiment of the present invention is configured to put the solid material made by mixing the potassium superoxide ($KO_2$) and the gypsum ($CaSO_4$) at the given ratio into the plastic container, together with the fish so as to supply oxygen to the fish, and in this case, the oxygen supply member needs a separate packing space and thus increases a packing cost.

Figure 6:
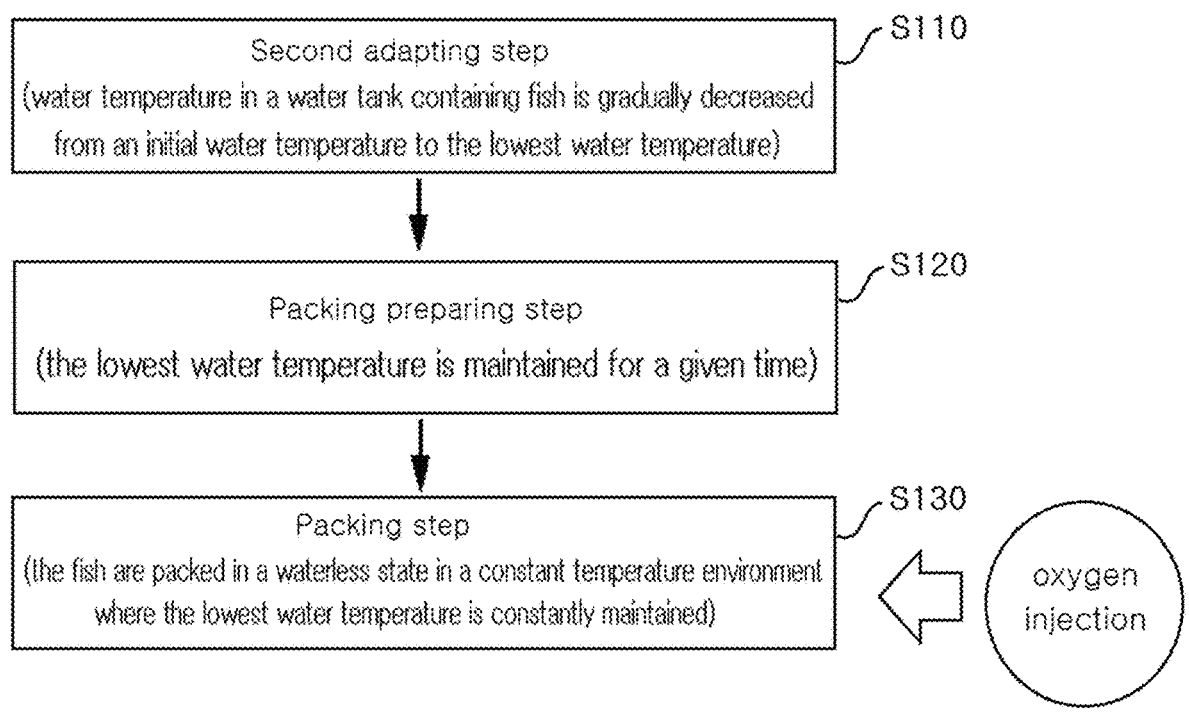
FIG. 6 is a flowchart showing a method for packing live fish according to the present invention.

FIG. 6 is a flowchart showing a method for packing live fish according to the present invention, and in this case, no cold shock is applied to fish when the fish are induced to artificial hibernation so as to be transported in a state of being alive.

First, a water temperature in a water tank containing fish is gradually decreased from an initial water temperature to the lowest water temperature so that the fish can adapt to the decreased water temperature (Second adapting step S110). The initial water temperature and the lowest water temperature are set according to fish species, fish habitats, seasons, and so on.

The second adapting step S110 gradually decreases the water temperature from the initial water temperature to the lowest water temperature so that the fish can adapt to the decreased water temperature.

Accordingly, the second adapting step S110 decreases the water temperature step by step to allow the fish to adapt well to the decreased water temperature. In detail, the water temperature is decreased by a given value until it reaches the lowest water temperature, and next, the decreased water temperature is kept for a given time. This is repeatedly carried out.

A ratio of water temperature to hour for decreasing the water temperature is freely set. For example, the step of decreasing the water temperature is carried out at a ratio of 5° C./hour. If the water temperature is changed too fast, stress may be applied to the fish.

If the water temperature is decreased up to the lowest water temperature, the lowest water temperature is maintained for a given time to prepare packing (Packing preparing step S120).

The second adapting step S110 and the packing preparing step S120 are carried out to not allow cold shock to be applied to the fish. In detail, the step of lowering the water temperature too fast is prevented from being carried out, thereby avoiding the stress caused by the cold shock.

The species of fish packed and transported according to the present invention are various, and for example, olive flounder are used in the present invention.

In case of the olive flounder, the initial water temperature is set to 15 to 17° C., and the lowest water temperature is set to 3 to 5° C. Table 10 shows detailed examples of the second adapting step S110 and the packing preparing step S120 in which the artificial hibernation of the olive flounder is carried out.

TABLE 10

| Summer season | |
|---|---|
| Water temperature (° C.) | Acclimation time (h) |
| 16° C. | 6 to 10 |
| 12° C. | 12 to 16 |
| 8° C. | 6 to 10 |
| 4° C. | 12 to 24 |
| Total | 36 to 60 |

As appreciated from Table 10, acclimation for 6 to 10 hours is kept at the initial water temperature of 16° C., for 12 to 16 hours at a water temperature of 12° C., for 6 to 10 hours at a water temperature of 8° C., and 12 to 24 hours at the lowest water temperature of 4° C. is carried out. In this case, the acclimation is carried out for total 36 to 60 hours. In Table 10, the changes of the water temperature and the acclimation time by section are set to minimize the stress of fish caused by the decrement of the water temperature.

If adaption to the lowest water temperature in the packing preparing step S120 is finished, the fish are packed in a waterless state (Packing step S130).

The packing step S130 is desirably carried out in a constant temperature environment where the lowest water temperature is constantly maintained, and the packing step S130 further includes the step of injecting a given amount of oxygen into a packing box. In this case, the state wherein the lowest water temperature is constantly maintained means that both of the lowest water temperature and the water temperature within a given range from the lowest water temperature can be constantly maintained. For example, if the lowest water temperature is 4° C., the constant temperature environment where the packing step S130 is carried out is maintained in the range between 3 and 5° C.

An oxygen concentration injected into the packing box is different according to fish species, and amounts of oxygen appropriate to the fish are injected into the packing box from the outside. Next, the packing box is sealed from the outside.

In case of olive flounder, desirably, an oxygen concentration injected into the packing box is greater than 45% and less than 55%.

Figure 7:
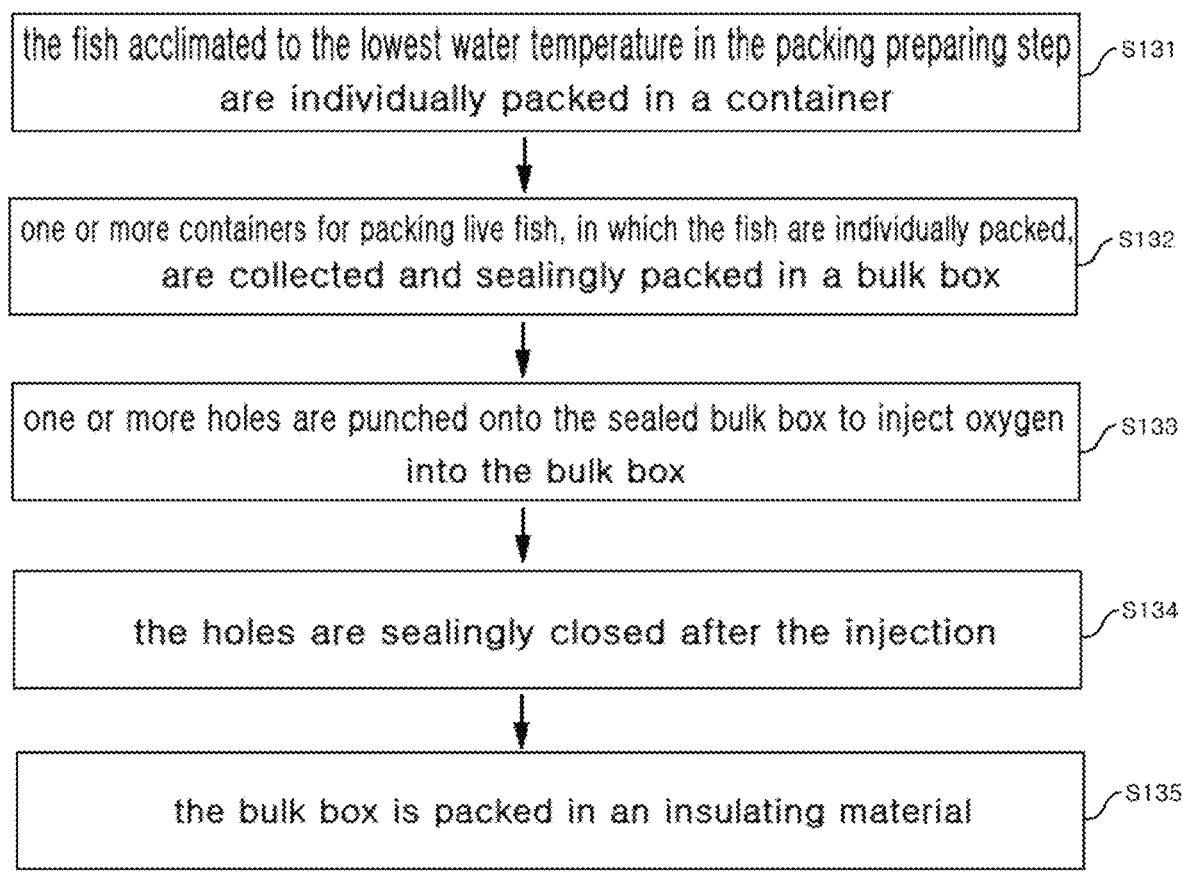
FIG. 7 is a flowchart showing a packing step of the method for packing live fish according to the present invention.
Figure 8A:
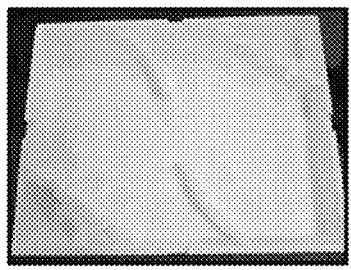
FIGS. 8a to 8f are photographs showing the packing procedure according to the present invention.
Figure 8B:
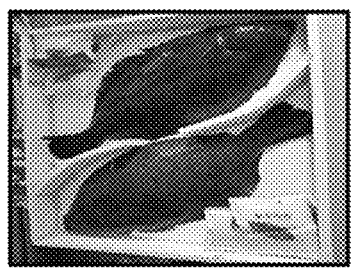
Figure 8C:
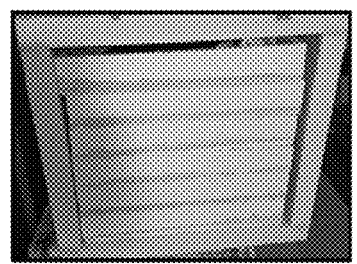
Figure 8D:
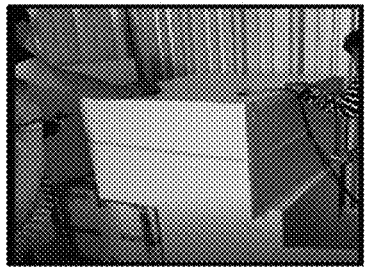
Figure 8E:
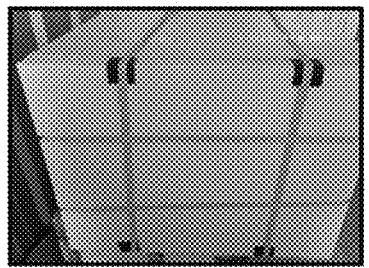
Figure 8F:
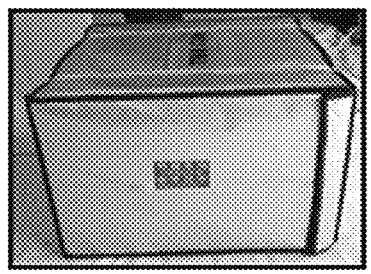

Referring to FIGS. 7 to 8f, detailed examples in the packing step S130 will be described.

First, the fish acclimated to the lowest water temperature in the packing preparing step S120 are individually packed in a container for packing live fish (Step S131). The container for individually packing the live fish is made of various materials, and for example, it may be made of Styrofoam.

One or more fish can be individually packed in one container for packing the live fish, and so as to maintain a temperature close to the lowest water temperature during transport of the fish, a refrigerant is also packed. FIGS. 8a and 8b show the container for packing live fish (Styrofoam box) capable of individually packing two olive flounder.

One or more containers for packing live fish, in which the fish are individually packed, are collected and sealingly packed in a bulk box (Step S132). The bulk box is made of various materials, and FIG. 8c shows an example wherein six Styrofoam boxes are packed in one bulk box.

One or more holes are punched onto the sealed bulk box to inject oxygen into the bulk box (Step S133), and after the injection, the holes are sealingly closed (Step 134).

Figure 10:
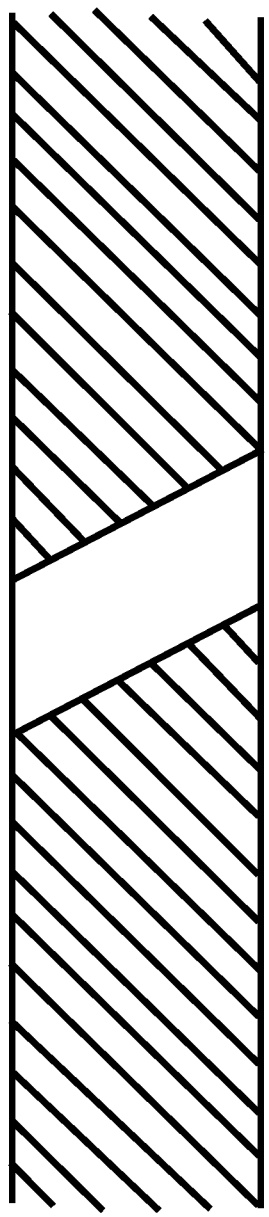
FIG. 10 is a cross-sectional view across a wall of a bulk box including a hole for injecting oxygen in a diagonal direction.

In this case, the holes for injecting the oxygen into the bulk box are desirably formed in a diagonal direction with respect to the surface of the bulk box, as shown in FIG. 10.

In detail, for example, fish are put in the Styrofoam box and are then accommodated and completely sealed in the bulk box. Before the bulk box is packed in an insulating box, next, two holes (having a diameter of 1 cm) are punched onto the outer surface of the bulk box in a diagonal direction, as shown in FIG. 10, and oxygen is injected into the holes by means of an air gun.

At this time, the pressure of the oxygen and the injection time of the oxygen are adjusted according to the size of the bulk box and the fish species, and after the injection of the oxygen, the holes are closed by means of stoppers. Also, surrounding areas of the holes are completely sealed by means of a silicone material.

The injected oxygen exists in a space between the container for packing live fish (Styrofoam box) and the bulk box and is thus supplied to the fish induced to the artificial hibernation through oxygen inlets as will be discussed later formed on the Styrofoam box.

FIG. 8d shows an example where oxygen is injected into the sealed bulk box, FIG. 8e shows a state where the bulk box is packed, and FIG. 8f shows an example where the bulk box is packed in an insulating material (Step S135).

Like this, the fish are acclimated for a given time (for example, 12 to 24 hours) at the lowest water temperature, without any cold shock, and are then packed in a constant-temperature room where the lowest water temperature is constantly maintained. Further, if the temperature at the inside of the container for packing live fish is constantly kept, the fish can be alive for 30 to 48 hours according to the oxygen concentration injected, without any water.

A container for packing live fish according to a second embodiment of the present invention is configured to transport the fish induced to the artificial hibernation in a state of being alive, and the container includes accommodation spaces for accommodating one or more fish individually, while they are not laid on each other, and one or more accommodation spaces for accommodating refrigerants.

Especially, the container for packing live fish has one or more oxygen inlets adapted to introduce oxygen supplied from the outside when a cap is covered thereon.

The container for packing live fish is made of various materials, and for example, it may be made of Styrofoam.

Figure 9A:
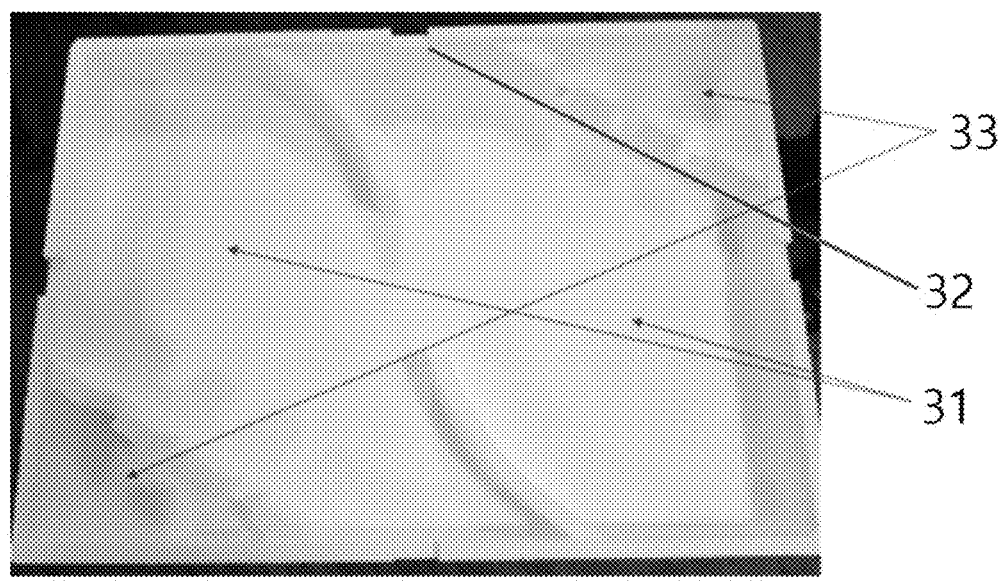
FIGS. 9a and 9b are photographs showing a container for packing live fish according to a second embodiment of the present invention.
Figure 9B:
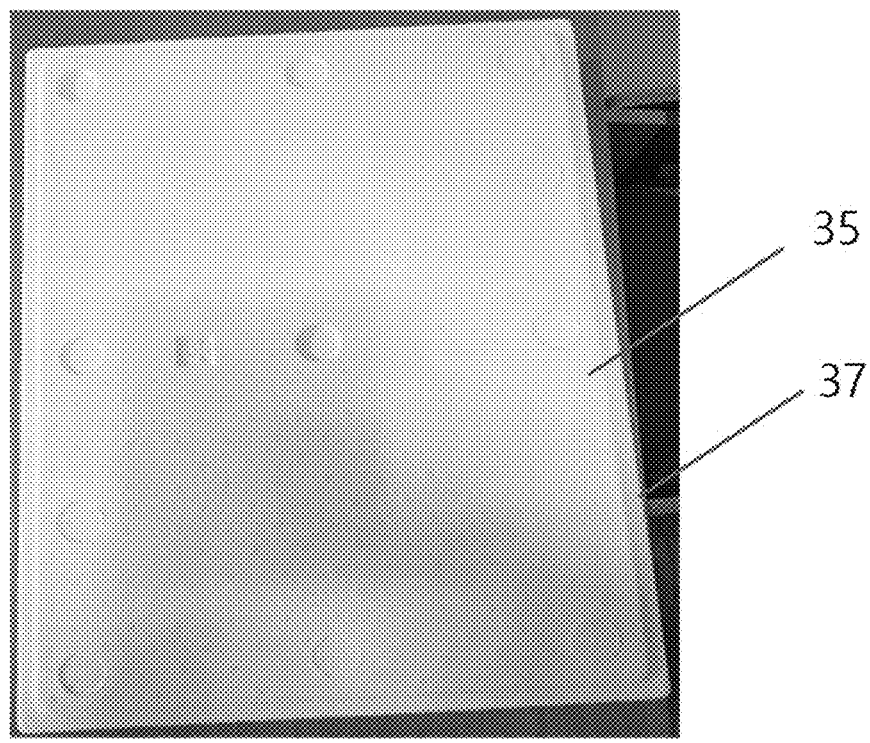

FIGS. 9a and 9b are photographs showing the container for packing live fish in which olive flounder are packed, wherein FIG. 9a shows a top surface of the container for packing live fish and FIG. 9b shows an underside surface of the container for packing live fish.

Two olive flounder accommodation spaces 31 are formed according to the shapes of the olive flounder to individually accommodate two olive flounder therein.

The olive flounder accommodation spaces 31 are formed to allow the two olive flounder to be arranged in the opposite directions to each other, thereby preventing them from coming into contact with each other. Further, two refrigerant accommodation spaces 33 are formed on the edges of the container for packing live fish on the tail sides of the olive founder.

Portions 37 with about a width of 15 mm along the edges of the underside of the container for packing live fish are formed lower by about 3 mm than the entire portion 35 except the portions 37. In detail, the entire portion 35 except the portions 37 with the width of about 15 mm convexedly protrudes from the underside of the container for packing live fish.

When the containers for packing live fish are stacked up, contrarily, the concaved portions formed along the edges of the underside of one container for packing live fish are engagingly placed on the convex portions formed along the edges of the top of the other container for packing live fish located on the underside of one container for packing live fish, so that one container for packing live fish serves as a cover for the other container for packing live fish.

Particularly, the oxygen inlets 32 are formed to introduce oxygen into the container for packing live fish from the outside. FIG. 9*a* shows four oxygen inlets 32 having a length of 3 cm and a depth of 2 cm, but the sizes, positions, and number of the oxygen inlets 32 may be freely set as necessary.

Second Example of Experiment

Examples of experiments of the method for packing live fish and the container for packing live fish according to the second embodiment of the present invention will be explained.

1. Experiment 2-1

Experiments for inducing artificial hibernation of 12 olive flounder (bastard halibut, *Paralichthys olivaceus*) (total 36 olive flounder) were carried out three times.

The olive flounder transported by a live fish vehicle were acclimated at a water temperature of 16° C. for seven hours, at a water temperature of 12° C. for 14 hours, at a water temperature of 8° C. for eight hours, and at a water temperature of 4° C. for 16 hours, and the olive flounder acclimated at the water temperature of 4° C. were drawn from a water tank and moved to a constant-temperature room. During the olive founder was packed, a temperature of the constant-temperature room was set to 4±1° C., so that an initial temperature in the container was maintained to the range between 4 and 5° C.

Further, the refrigerants (of 600 g on top of the container for packing live fish, 400 g on a portion just below the top, 200 g on an intermediate portion, and 400 g on the bottom) were accommodated together with the olive flounder, thereby allowing the temperature of the container for packing live fish to be kept at a temperature of 5° C. for 30 hours.

Next, the bulk box into which the containers for packing live fish were stacked up was sealed and blocked from the air in the atmosphere, and two holes having a diameter of 1 cm were punched diagonally on the bulk box. After that, oxygen was injected at a pressure of 2 bar for 20 seconds into the holes by means of an air gun, and if an oxygen concentration is 50.5%, the holes were blocked by stoppers, while the surrounding areas around the holes being sealed by silicone.

The bulk box was open in 30 hours. The olive flounder were put in sea water of 8° C., and next, the survival rate of the olive flounder was checked in 24 hours.

Table 11 shows the results of the experiments, and the survival rate of the olive flounder induced to the artificial hibernation is 94.4%.

TABLE 11

| No. | Times of experiment | Mean body length (mm) | Mean body height (mm) | Mean body weight (g) | Number of fish (n) | Number of fish alive (n) | Number of dead fish (n) | Survival rate (%) | Hibernation inducing time in waterless state (h) |
|---|---|---|---|---|---|---|---|---|---|
| 1 | 3 | 561 | 260 | 2083 | 36 | 34 | 2 | 94.4 | 30 |

2. Experiment 2-2

When the same experiments of starry fish (*Paralichthys stellatus*) as of the olive flounder were carried out, also, the same results of experiments were obtained.

Under the same condition as in the olive flounder, 10 starry fish per one time were prepared two times, and 13 starry fish per one time were prepared one time. Total 33 starry fish were tested. The starry fish transported by a live fish vehicle were acclimated at a water temperature of 16° C. for seven hours, at a water temperature of 12° C. for 14 hours, at a water temperature of 8° C. for eight hours, and at a water temperature of 4° C. for 16 hours, and the starry fish acclimated at the water temperature of 4° C. were drawn from a water tank and moved to a constant-temperature room. During the starry fish were packed, a temperature of the constant-temperature room was set to 4±1° C., so that an initial temperature in the container was maintained to the range between 4 and 5° C. Further, the refrigerants (of 600 g on top of the container for packing live fish, 400 g on a portion just below the top, 200 g on an intermediate portion, and 400 g on the bottom) were accommodated together with the starry fish, thereby allowing the temperature of the container for packing live fish to be kept at a temperature of 5° C. for 30 hours.

Next, the bulk box into which the starry fish packing containers were stacked up was sealed and blocked from the air in the atmosphere, and two holes having a diameter of 1 cm were punched diagonally on the bulk box. After that, oxygen was injected at a pressure of 2 bar for 20 seconds into the holes by means of an air gun, and if an oxygen concentration is 50.5%, the holes were blocked by stoppers, while the surrounding areas around the holes being sealed by silicone.

The bulk box was open in 30 hours. The starry fish were put in sea water of 8° C., and next, the survival rate of the starry fish was checked in 24 hours. Table 12 shows the results of the experiments, and in 30 hours, the survival rate of the starry fish induced to the artificial hibernation is 94%.

TABLE 12

| No. | Times of experiment | Mean body length (mm) | Mean body height (mm) | Mean body weight (g) | Number of fish (n) | Number of fish alive (n) | Number of dead fish (n) | Survival rate (%) | Hibernation inducing time in waterless state (h) |
|---|---|---|---|---|---|---|---|---|---|
| 1 | 3 | 381 | 269 | 1036 | 33 | 31 | 2 | 94 | 30 |

3. Experiment 2-3

Table 13 shows results of experiments wherein the olive flounder are packed when an initial oxygen concentration of the container for packing the live fish is 20.9%. The entire experiment conditions except the initial oxygen concentration are same as the first experiment.

TABLE 13

| No. | Times of experiment | Mean body length (mm) | Mean body height (mm) | Mean body weight (g) | Number of fish (n) | Number of fish alive (n) | Number of dead fish (n) | Survival rate (%) | Hibernation inducing time in waterless state (h) |
|---|---|---|---|---|---|---|---|---|---|
| 1 | 3 | 549 | 264 | 2107 | 37 | 24 | 13 | 65 | 24 |

The results of the experiments of oxygen consumption of the olive flounder show that if the initial oxygen concentration in the container is an oxygen concentration (20.9%) in the air, the survival rate of the olive flounder in 24 hours is 65%.

If the survival rate of 65% is compared with the survival rate of 94.4% at the initial oxygen concentration in the container of 50.5%, it has a big difference. Through such results of the experiments, it can be appreciated that the initial oxygen concentration has great influences on the survival rate of the live fish.

Also, it is important to constantly keep a temperature in the container for packing live fish.

The fish only perform basal metabolism at the lowest water temperature, and accordingly, an amount of energy in the body to be lost to the outside of the body can be minimized, thereby making possible to allow the fish to be alive for long hours.

In case of olive flounder, it is most desirable that a temperature in the container for packing live fish is 4±1° C.

If a temperature in the container for packing live fish is 6° C., the olive flounder are recovered from the hibernation and thus consume larger amount of oxygen, so that they fast consume the oxygen limited in the container for packing live fish and thus die.

Further, the olive flounder are packed at a constant-temperature room kept constantly to 4±1° C., thereby desirably preventing changes in temperature.

4. Experiment 2-4

After 12 olive flounder were induced to artificial hibernation, they were put in a Styrofoam box, and Styrofoam boxes in which the olive flounder were put were stacked up in a bulk box (with a thickness of 50 mm). After an oxygen concentration in the bulk box was measured in control (general oxygen concentration in the air of 20.9%), oxygen was injected at a pressure of 2 bar for 20 seconds, so that the oxygen concentration reached 50.5%.

In 30 hours at the constant temperature of 5° C., an amount of oxygen changed in the bulk box was about 31.5%, which was changed by average 18.94%.

However, the oxygen concentration decreased naturally in the bulk box was just 4.3% in 30 hours, and accordingly, the oxygen concentration of 14.63% (18.94%-4.3%) was consumed, while the survival rate of the olive flounder was 100%.

Table 14 shows results of measuring changes in the oxygen concentration in the bulk box.

TABLE 14

Change in oxygen concentration in bulk box (Picoammeter) 0.899 to 0.900 V, Styrofoam box in bulk box, 2 bar, 20 sec

| Sensor No. | 7 | 8 | 9 | Remark |
|---|---|---|---|---|
| Oxygen in the air (20.9%) | 718 | 20.9% 457 | 502 | 2018 Sep. 12 10:30 |
| Just after injection of oxygen whose concentration is calculated A | 51.14% 1757 | 49.3% 1078 | 50.92% 1223 | 2018 Sep. 12 11:00 |
| In 30 hours after injection of oxygen whose concentration is calculated B | 33.65% 1156 | 30.41% 665 | 30.48% 732 | 2018 Sep. 13 17:00 |
| Concentration change percentage (%) between A and B | 17.49% | 18.89% | 20.44% | 18.94% |

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:
1. A method for packing fish so as to transport the fish in a state of being alive, the method comprising:
adapting the fish to a water temperature by gradually decreasing the water temperature from an initial water temperature to a lowest water temperature;
preparing for packing by maintaining the lowest water temperature for a given time; and
packing the fish in a waterless state in an environment a temperature of which is maintained at the lowest water temperature,
wherein a given amount of oxygen is injected into a packing box during the packing of the fish, wherein the packing of the fish comprises:
- individually packing the fish in a packing container;
- packing one or more packing containers in a bulk box and sealing the bulk box;
- punching one or more holes onto the bulk box and injecting oxygen into the bulk box;
- sealing the holes adapted to inject the oxygen into the bulk box; and
- packing the bulk box in an insulating material, wherein the holes for injecting the oxygen into the bulk box are oriented in a non-perpendicular direction with respect to the surface of the bulk box, wherein sealing the holes adapted to inject the oxygen into the bulk box comprises blocking the holes with stoppers and sealing areas surrounding the holes with silicone.

2. The method according to claim 1, wherein the step of adapting the fish comprises: repeatedly performing a process of decreasing the water temperature by a given value until the water temperature reaches the lowest water temperature and then maintaining the water temperature for a given time, and a ratio of decreasing the water temperature is 5° C./hour or under.

3. The method according to claim 1, wherein the fish are olive flounder, the initial water temperature ranges between 15 and 17° C., the lowest water temperature ranges between 3 and 5° C., and the fish are maintained at the initial water temperature for 6 to 10 hours, at a water temperature of 12° C. for 12 to 16 hours, at a water temperature of 8° C. for 6 to 10 hours, and at the lowest water temperature for 12 to 24 hours.

4. The method according to claim 3, wherein during the packing of the fish, an oxygen concentration injected into the packing box is greater than 45% and less than 55%.

* * * * *